C. BROWN.
APPARATUS FOR MEASURING THE FLOW OF LIQUIDS.
APPLICATION FILED DEC. 18, 1917.

1,347,143. Patented July 20, 1920.

Inventor:-
Clement Brown,
By:- B. Singer
Atty.

UNITED STATES PATENT OFFICE.

CLEMENT BROWN, OF BIRMINGHAM, ENGLAND.

APPARATUS FOR MEASURING THE FLOW OF LIQUIDS.

1,347,143.  Specification of Letters Patent. Patented July 20, 1920.

Application filed December 18, 1917. Serial No. 207,701.

*To all whom it may concern:*

Be it known that I, CLEMENT BROWN, a subject of the Kingdom of Great Britain, residing at 19 Trinity road, Birchfield, Birmingham, Warwickshire, England, have invented certain new and useful Improvements in or Relating to Apparatus for Measuring the Flow of Liquids, of which the following is a specification.

This invention comprises certain improvements in or relating to apparatus for measuring the flow of liquids.

According to the present invention, the liquid is supplied under a suitable head to a calibrated orifice through which it is adapted to flow. Beyond this orifice the conduit containing the liquid is bifurcated; one conduit of the bifurcation extends upwardly, while the other conduit is adapted to convey the fluid to be measured. The liquid rises in the first-mentioned bifurcation according to the quantity of liquid flowing per unit time through the other bifurcation.

In order that this invention may be clearly understood and readily carried into practice, reference may be had to the appended explanatory sheet of drawings, upon which:—

Figure 1:
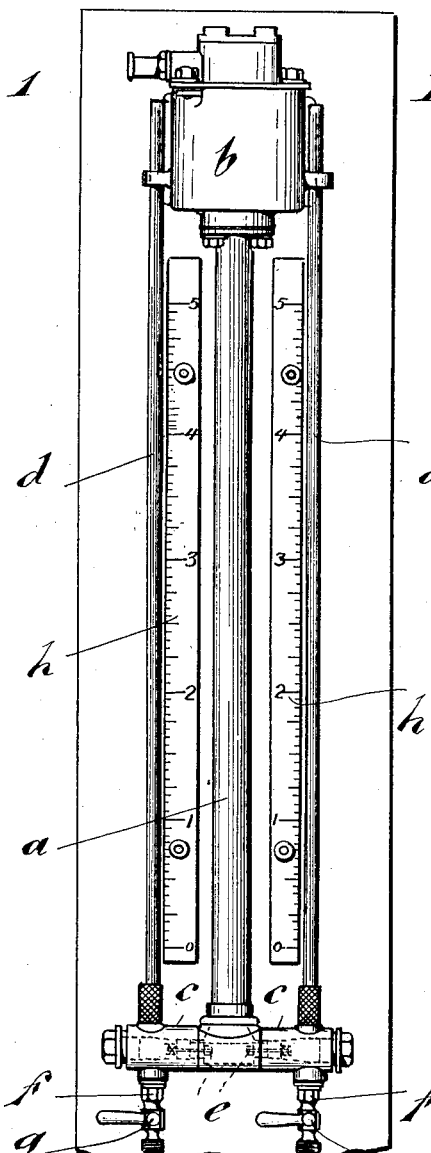
Figure 1 is a front elevation of an apparatus according to the present invention.
Figure 2:
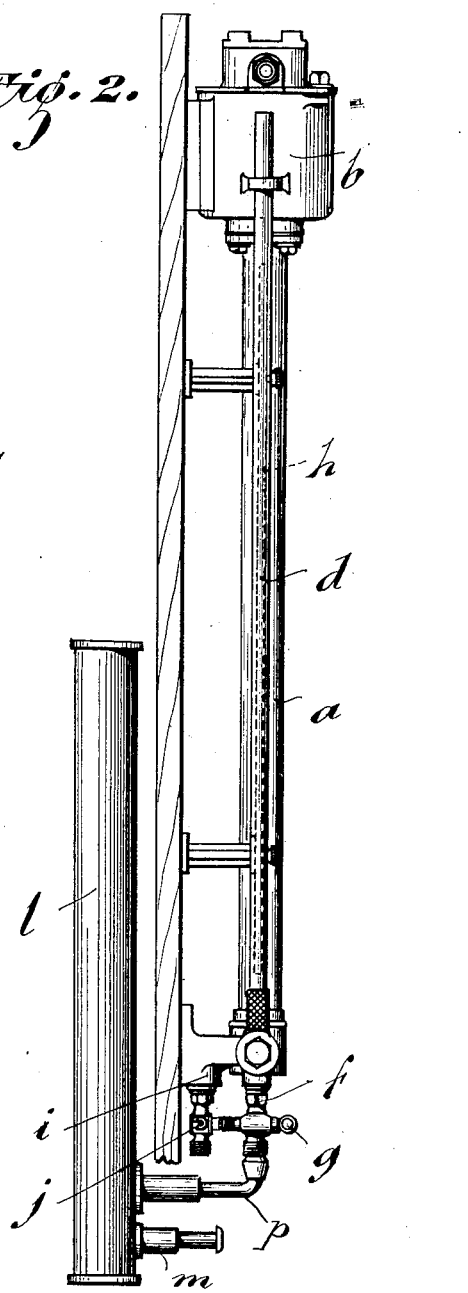
Fig. 2 is a side elevation of the apparatus shown in Fig. 1 with an additional apparatus hereinafter described applied thereto.
Figure 3:
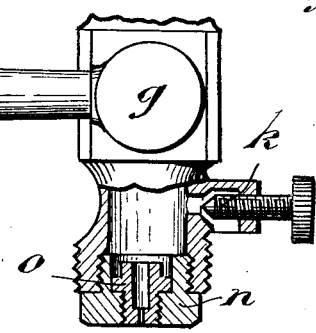
Fig. 3 is an enlarged partly sectional elevation of one of the cocks shown in Fig. 1, illustrating the utilization of the apparatus for ascertaining the size of an orifice.

In a convenient embodiment of the present invention, the apparatus involves a vertical tube $a$ which may be fitted at the top with a float or other constant level supply chamber. This vertical tube has a lateral extension $c$ at its lower extremity, and from said lateral extension a glass tube $d$ extends upwardly to a point above the liquid level of the float chamber $b$. Between the tube associated with the float chamber and the glass tube in the connecting conduit, a constriction or calibrated orifice $e$ is provided. Below the glass conduit a conduit $f$ extends downwardly, in which conduit a cock or valve $g$ may be provided. This downwardly extending conduit may be placed in communication with the apparatus in which the liquid is used. Alternatively a jet or orifice may be assembled in relation to this outlet. The flow of fluid through this orifice, and thus the size of the orifice, can be ascertained. In relation to the glass tube a graduated scale $h$ may be fixed adapted to indicate the rate of flow or quantity per unit time measured by the apparatus.

A second bifurcation $i$ may extend from the lateral extension $c$ of the supply tube, and said second bifurcation may terminate with a calibrated orifice. The flow of liquid to this calibrated orifice may be controlled by a cock $j$. This orifice is of known capacity and by allowing the liquid to flow through it the graduated scale $h$ which is adjustable, may be affixed in a precisely correct position in relation to the glass tube for subsequent measurement. The conditions of measurement are liable to vary as a result of temperature, atmospheric conditions, etc., hence the desideratum of correctly locating the graduated scale periodically.

On the egress side of the cock $g$ through which the liquid to be measured normally passes, provision may be incorporated for releasing any air which may be confined below the cock. This provision may, for instance, comprise an air egress opening which is controlled by a suitable valve $k$. Before opening the cock which delivers the liquid to be measured, it is desirable to open this valve. The cock $g$ is then opened and the air release valve $k$ subsequently closed after any air has escaped.

In connection with a single float chamber $b$ and tube $a$ descending therefrom, the apparatus above described may be duplicated. Thus the supply tube $b$ from the float chamber may at its lower extremity branch with two or more lateral conduits $c$, in each of which a calibrated orifice $e$ is provided, beyond which the bifurcations for indication and delivery are provided. The calibrated orifices in the several branches may be identical, or they may differ.

The invention may, for instance, be utilized for measuring the quantity of liquid fuel delivered to an internal-combustion engine. For this purpose the delivery conduit may extend from the delivery cock $g$ to a carbureter with or without a float chamber. In case the method of utilization of the liquid should be of such an intermittent or other character as to result in a continued or substantially continued alternating movement of the level in the indicator tube, I may provide between the delivery cock $g$ and the apparatus at which the liquid is used, an air chamber $l$. The conduit $p$ from the delivery cock may enter this air chamber at one level, which may be suitably below the top, and an outlet $m$ from said chamber may be provided at a lower level extending to the apparatus at which the liquid is utilized. With the exception of this inlet and outlet provision, the air chamber $l$ is closed. A certain amount of liquid accumulates in the air chamber to a level above the ingress opening therein until by the internal pressure of the air, further ingress of liquid is prevented, the liquid being thus admitted as it egresses.

In utilizing the apparatus for measuring the capacity of a jet, the nozzle of the delivery cock may be adapted to receive an adapter $n$ into which the jet $o$ may be screwed. The liquid may then be allowed to flow through the jet and the rate of flow ascertained.

The operation of the device is as follows: Liquid from the constant level chamber $b$ descends by way of the tube $a$ and then flows rapidly through calibrated orifice $e$. Thereafter the liquid egresses through the cock $g$. As the liquid passes from the orifice $e$ to cock $g$, it rises in the tube $d$, and the extent to which it rises in this tube depends upon the rate of egress by way of cock $g$. To adapt the apparatus to measurements, to variable temperatures and atmospheric conditions, the test outlet $j$ of known capacity is opened and a scale $h$ is adjusted in accordance with the rate of flow thus established for the particular air and temperature conditions. As indicated before, the air confined below cock $g$ is released by opening the valve $k$.

What I claim as my invention and desire to secure by Letters Patent is:—

1. Apparatus for measuring the flow of liquids, including a constant level chamber, a supply conduit descending therefrom, a trifurcation forming the terminal of said conduit and communicating with said conduit through a calibrated orifice, a vertically extending tube rising from one branch of said trifurcation, an outlet pipe secured to the second branch, and a test outlet secured to the third branch of said trifurcation, said test outlet having a calibrated orifice and permitting discernment of a particular rate of flow under varying temperature conditions.

2. Apparatus for measuring the flow of liquids, including a constant level chamber, a supply conduit descending therefrom, a trifurcation forming the terminal of said conduit and communicating therewith through a calibrated orifice, a vertical glass tube rising from one branch of said trifurcation, an adjustable graduated scale arranged in proper position relative to said glass tube, an outlet pipe secured to the second branch, and a test outlet secured to the third branch of said trifurcation, said test outlet having a calibrated orifice of known capacity, said graduated scale being theoretically arranged in accordance with the rate of flow obtained through said test outlet.

3. Apparatus for measuring the flow of liquids, including a constant level chamber, a supply conduit descending therefrom, a trifurcation forming the terminal of said conduit and communicating with said conduit through a calibrated orifice, a vertically extending conduit rising from one branch of said trifurcation, an outlet pipe secured to the second branch having a cock, a vent for said outlet pipe arranged below said cock, and a test outlet secured to the third branch of said trifurcation, said test outlet having a calibrated orifice and permitting the discernment of the particular rate of flow under varying temperature conditions.

In witness whereof I have hereunto set my hand in the presence of two witnesses.

CLEMENT BROWN.

Witnesses:
ARTHUR H. BROWN,
EDGAR N. WHEELER.